(No Model.) 3 Sheets—Sheet 2.
D. LA MONT ASPINWALL.
ANIMAL TETHER.
No. 349,625. Patented Sept. 21, 1886.
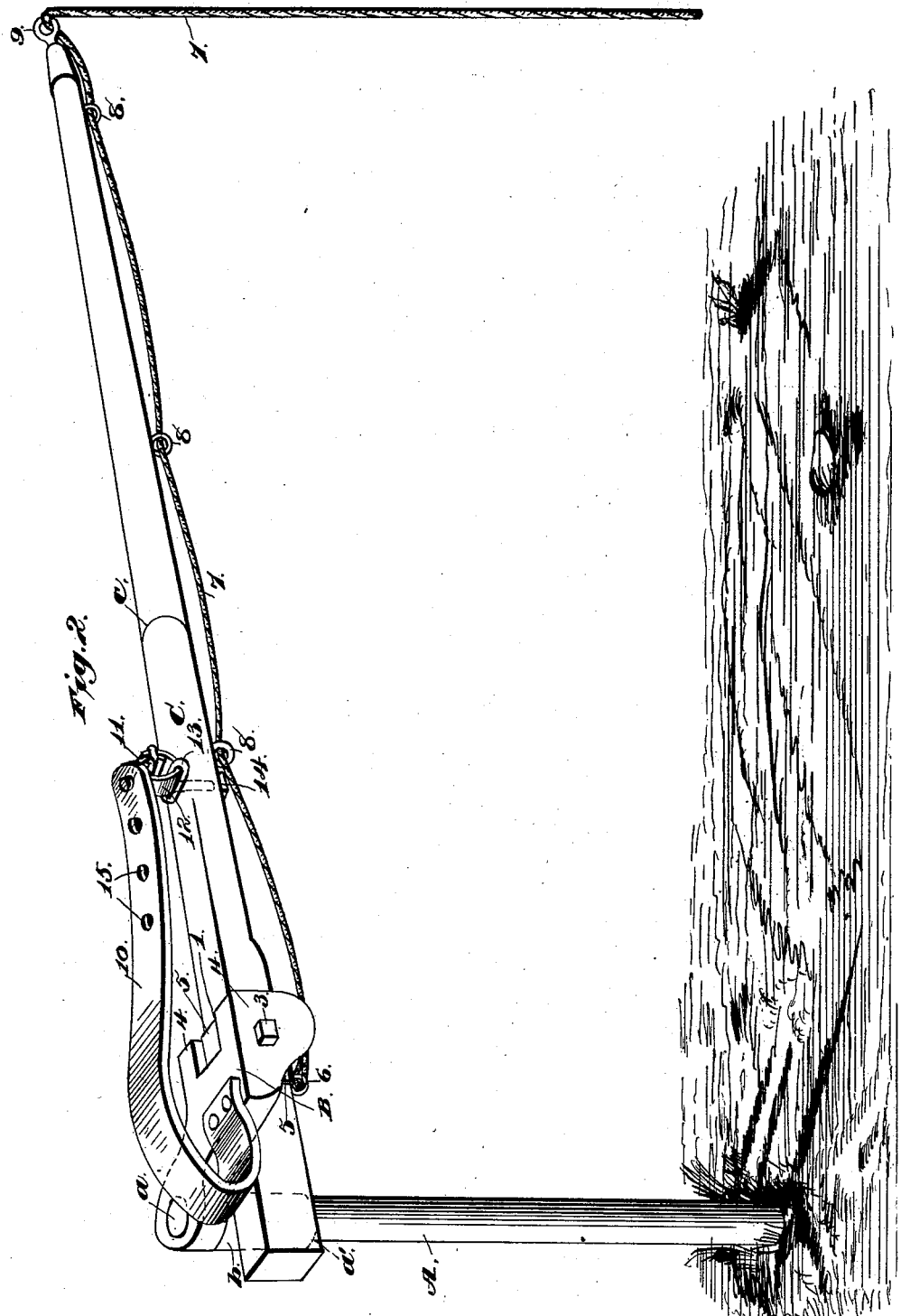

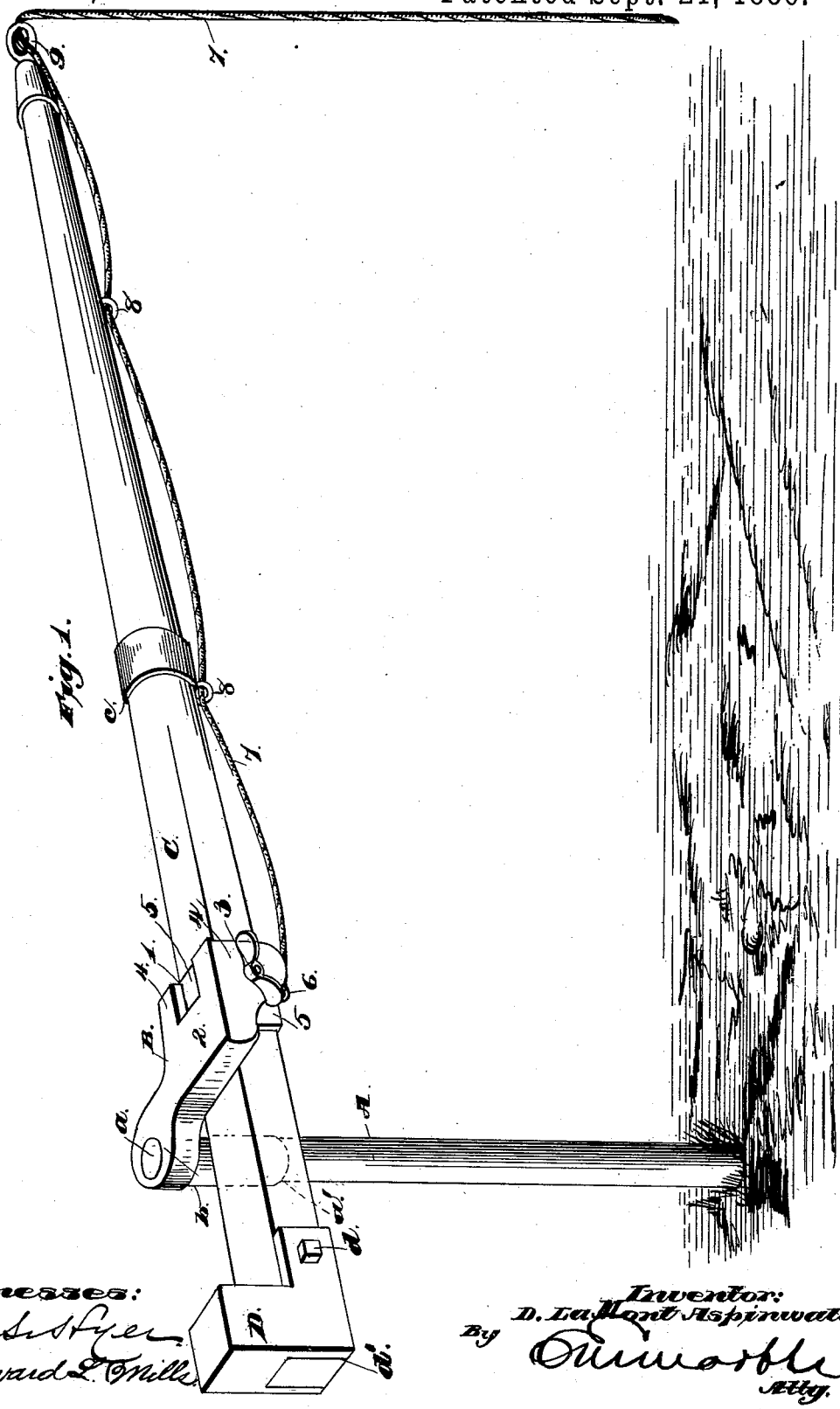

(No Model.) 3 Sheets—Sheet 3.
D. LA MONT ASPINWALL.
ANIMAL TETHER.
No. 349,625. Patented Sept. 21, 1886.
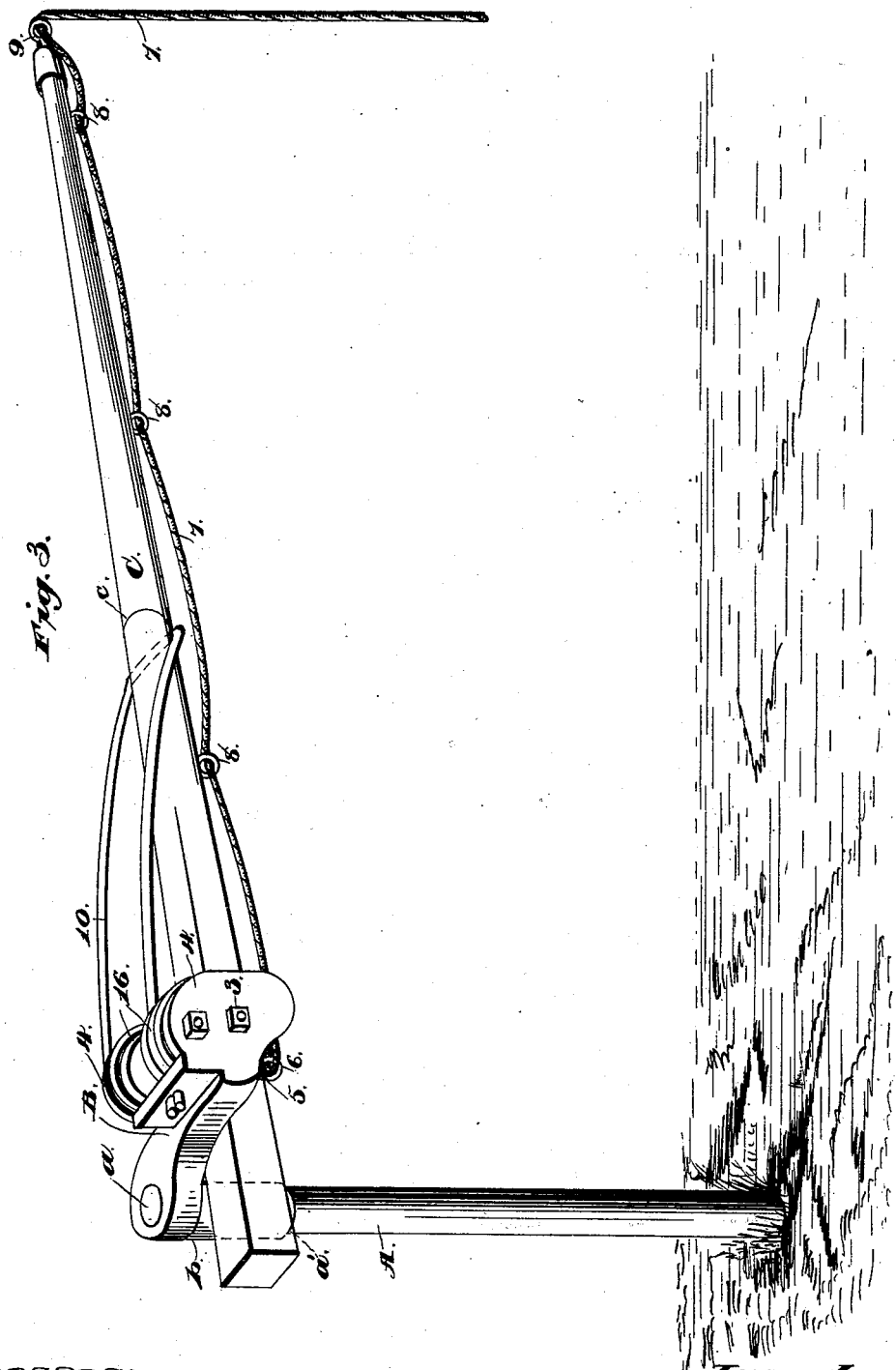

United States Patent Office.

D. LA MONT ASPINWALL, OF PETERSBURG, VIRGINIA, ASSIGNOR TO THE AMERICAN ANIMAL TETHER COMPANY.

ANIMAL-TETHER.

SPECIFICATION forming part of Letters Patent No. 349,625, dated September 21, 1886.

Application filed July 24, 1886. Serial No. 208,952. (No model.)

*To all whom it may concern:*

Be it known that I, D. LA MONT ASPINWALL, a citizen of the United States, residing at Petersburg, in the county of Dinwiddie and State of Virginia, have invented certain new and useful Improvements in Animal-Tethers; and I do hereby declare the following to be a full, clear, and exact description of the invention, such as will enable others skilled in the art to which it appertains to make and use the same.

My invention relates to animal-tethers; and it consists in the construction and arrangement of the parts, which will be more fully hereinafter described, and pointed out in the claims.

The object of my invention is to provide a tether which will admit of the free movement of the animal hitched thereto in any direction around a central supporting-post, and to have the parts so constructed as to keep the securing rope, strap, or chain away from the feet of the said animal by holding up the slack constantly, thereby preventing them from striking any projections, which would be liable to result in injury, all of which I accomplish by means which are simple and effective in their construction, strong and durable, easily and readily handled and transported, and cheaply manufactured. I attain these objects by the mechanism illustrated in the accompanying drawings, wherein like letters and figures of reference indicate similar parts in the several views, and in which—

Figure 1 is a perspective view of my improved animal-tether. Fig. 2 is a perspective view of a modification of the same, and Fig. 3 is a like view of a further modification.

A indicates a supporting-post, which is adapted to be driven or set in the ground, and has a pivotal bearing, $a$, formed on the top portion thereof. The pivotal bearing $a$, by its formation leaves a bearing-shoulder, $a'$, upon which a socketed depending projection, $b$, of an arm, B, fits and revolves, resting upon the shoulder $a'$, and swinging or revolving on the pivotal bearing $a$. The arm B has a slot, 1, passing therethrough, leaving a shoulder or solid surface, 2, in the upper portion of the said arm B. A reach, C, passes through the slot 1 in the arm B, and is pivoted thereto by a bolt and set-nut, 3, which passes through the projecting ears 4 4 of the said arm B, and through the reach C. The said reach passes through the slot 1, and has a weight, D, bolted near its end by means of the bolt $d$, passing through the weight and reach. The weight D has a slot, $d'$, formed therein, and the reach C passes therethrough, the greater portion of the weight being on top of the reach when in an operative position. This reach C has a metal clip, 5, which forms a bearing in the slot 1, for the action of the arm B thereon. The under side of the clip 5 has a loop, 6, to which a rope, chain, or strap, 7, is secured, the said rope, strap, or chain 7 passing through suitable screw-eyes 8, which are screwed into the reach, said reach having a guide, 9, similar to the screw-eyes 8, through which the rope or chain 7 passes, and is extended to such a length beyond the end of the reach as may be desired. By supporting the rope 7 in this manner the direct strain is taken away from the end of the reach and exerted at a point near the supporting-post. The reach C may be formed with suitable joints, $c$, as shown in Fig. 1, so that it can be taken apart and packed in a suitable manner for transportation.

In Fig. 2 the reach C and arm B are constructed and engage with each other in a manner similar to the device illustrated in Fig. 1. In this instance the weight D is dispensed with, and a flat spring, 10, is secure to the upper portion of the arm B, being suitably bent to give it the desired spring, and extends over the reach, having a loop, 11, secured in its free end, which is engaged by an adjusting-strap, 12, which passes through a loop, 13, secured to the reach C, said loop 13 being screw-threaded on its lower end, and secured by an adjustable nut, 14. The spring 10 has a series of apertures, 15, formed therein, which are engaged by the loop 11, and the resiliency of the said spring is thus controlled by the adjustment of the loop 11. In Fig. 3 a similar modification is illustrated; but in this instance the spring 10 is formed of wire, having a coil, 16, at its ends, which is secured in ears in the arm B. In this instance, also, the said spring 10 embraces the reach C, being in the form of a loop, and passes under the said reach, which bears down upon the said spring. The rope or chain 7 in these modifications is secured to the rear portion of the reach adjacent to the arm B. By supporting the rope 7 in connection with the reach C, as hereinbefore described, a sagging or depression of the same is prevented, and at the same time all the slack of the rope tether is promptly taken up, and the action of the entire device is rendered more effective and positive.

The reach, as shown in Fig. 1, and in the modified forms, Figs. 2 and 3, will be at all times raised automatically when the animal attached to the rope comes near to the device. When receding therefrom, the reach is drawn downward; but as soon as the rope or chain is relaxed or slacked the said reach rises upward as far as it is permitted by said relaxation. The reach is allowed to swing around on the post A, through the medium of the socketed portion of the arm B, thus allowing a greater freedom to the animal in grazing.

This device is especially adapted for farming, emigrant, or army usage, being readily and conveniently taken apart or set up, and easily carried from one place to another.

It is obvious that many minor changes in the construction and arrangement of the parts might be made and substituted for those shown and described without in the least departing from the nature and principle of my invention.

I am aware that tethers have been made wherein a supporting-post is used provided with a slotted swinging arm having a tilting sweep mounted therein, which is provided with an operating-weight attached to one end thereof, and such I do not broadly claim as my invention.

Having thus described my invention, what I claim as new, and desire to secure by Letters Patent, is—

1. In an animal-tether or hitching-post, the combination of the supporting-post, a swinging arm mounted thereon having a socketed projection, a slot, and a shoulder or stop at one side of the socket, a pivoted reach passing through the slot in said swinging arm, adapted to be automatically raised or tilted by a weight or spring, and means for attaching the animal to the said reach, substantially as described.

2. In an animal-tether or hitching-post, the combination of a supporting-post having a bearing at its top, a socketed swinging arm having a slot cut therethrough, engaging with the supporting-post, a shoulder or stop at one side of the socket in the said swinging arm, a jointed reach having the hitching-rope supported by and secured thereto, passing through and pivotally mounted in the slot in the swinging arm, to one side of the socket thereof, and means for raising or tilting the reach, substantially as described.

3. In an animal-tether or hitching-post, the combination of the supporting-post A, a swinging arm, B, mounted thereon, having a socketed projection, $b$, a slot, 1, and a shoulder or stop, 2, at one side of the socket $b$, a pivoted reach, C, passing through the slot in said swinging arm, adapted to be automatically raised or tilted by a weight or spring, suitable joints, $c$, formed therein, and a rope, 7, passing through eyes 8, secured to the said reach C, substantially as described.

In testimony whereof I affix my signature in presence of two witnesses.

D. LA MONT ASPINWALL.

Witnesses:
JOHN LYON,
JAS. MCDONALD.